United States Patent [19]

Feldmann et al.

[11] 4,006,791
[45] Feb. 8, 1977

[54] DEVICE FOR REGULATING THE TRAVELING SPEED OF A MOTOR VEHICLE

[75] Inventors: Joachim Feldmann, Helstorf; Arnold Mann, Bieber; Ludolf Heimbach, Frankfurt, all of Germany

[73] Assignee: VDO Adolf Schindling AG, Frankfurt am Main, Germany

[22] Filed: Nov. 4, 1974

[21] Appl. No.: 520,782

[30] Foreign Application Priority Data

Nov. 9, 1973  Germany .................. 2356012

[52] U.S. Cl. .............. 180/108; 123/102; 180/105 R
[51] Int. Cl.² ....................... B60K 31/00
[58] Field of Search ............ 180/105–109; 123/102, 103 R; 192/.033

[56] References Cited

UNITED STATES PATENTS

| | | | |
|---|---|---|---|
| 3,070,185 | 12/1962 | Fales | 180/108 |
| 3,087,340 | 4/1963 | McMurray | 180/108 X |
| 3,195,672 | 7/1965 | Brennan | 180/105 R |
| 3,249,175 | 5/1966 | Baxter | 180/105 E |
| 3,332,406 | 7/1967 | Perry | 123/102 |
| 3,340,950 | 9/1967 | Hopengarten | 180/105 R |
| 3,447,624 | 6/1969 | Balan | 180/105 R |
| 3,485,316 | 12/1969 | Slavin | 180/105 R |
| 3,648,798 | 3/1972 | Jania | 180/105 E |
| 3,752,252 | 8/1973 | Sakakibara | 180/105 E |
| 3,766,367 | 10/1973 | Sumiyoshi | 180/105 E X |

Primary Examiner—Philip Goodman
Assistant Examiner—Terrance L. Siemens
Attorney, Agent, or Firm—Otto John Munz

[57] ABSTRACT

A device for regulating the traveling speed of a motor vehicle, comprising an electric regulator acted upon by a speed-responsive signal, which regulator compares the prevailing travel-speed with a prespecified desired traveling speed and, in the case of a deviation of the actual traveling speed from the prespecified one, emits a signal proportional to the deviation variable. The device comprises a pneumatic adjusting drive, preferably the accelerator, which acts upon an element affecting the ratio between fuel and air in the fuel-air mixture fed to the motor vehicle engine. The adjusting drive is in turn acted upon by a vacuum or excess pressure or normal pressure by way of a control stage which is responsive to a signal emitted by the regulator.

9 Claims, 3 Drawing Figures

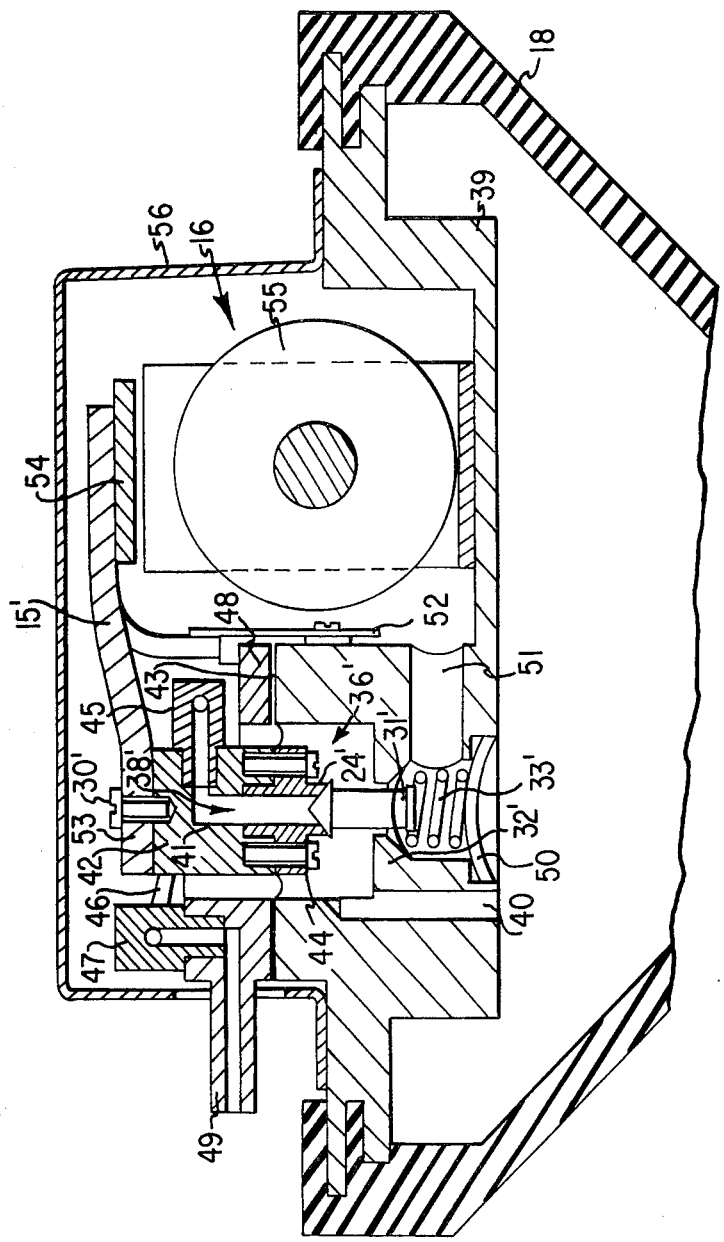

DEVICE FOR REGULATING THE TRAVELING SPEED OF A MOTOR VEHICLE

BACKGROUND OF THE INVENTION

1. Field of the Invention

The invention relates to an electropneumatic device for regulating the speed of a motor vehicle.

2. Description of the Prior Art

In a known device for regulating the traveling speed of a motor vehicle, an electric regulator is provided which compares the actual speed of a motor vehicle with a traveling speed preset by the driver. The regulator provides a signal indicative of the deviation of the two traveling speeds to a control stage. The control stage controls a pneumatic adjusting drive which acts upon the accelerator. The adjusting drive consists of a chamber which on one side is closed by means of a rolling diaphragm which is connected with the accelerator. The control stage associated with the adjusting drive comprises two magnetic valves mounted in the chamber wall of the adjusting drive, which can be controlled by the electric regulator. The chamber of the adjusting drive can be connected by way of one of the magnetic valves with the ambient air, i.e. the air surrounding the motor vehicle, and by way of the other magnetic valve with the carburetor intake pipe and thus be acted upon by the vacuum prevailing in the carburetor intake pipe. When the actual traveling speed of the motor vehicle exceeds the traveling speed set by the driver, the chamber is ventilated, and the adjusting drive actuates the accelerator toward a speed decrease. When, on the other hand, the actual traveling speed is lower than the preset speed, the other magnetic valve is actuated, and the chamber is acted upon by a vacuum, whereby the accelerator is adjusted toward a speed increase.

Such a structure of the control stage of the regulator has considerable disadvantages. For instance, an electric regulator with two signal outputs must be used for controlling the two magnetic valves. In comparison with an electric regulator with only one signal output, this results in an increased expenditure for circuits and structural parts and thus in increased production cost. In addition, because of vacuum variations in the suction pipe, the lift variation of the rolling diaphragm depends on the deviation of the actual traveling speed from the peset traveling speed as well as on the magnitude of the prevailing vacuum. In order to eliminate this dependency of the diaphragm lift on the vacuum, an electric measuring device which determines the lift variation is provided. The output signal of the measuring device is fed to the electric regulator to carry out a corresponding correction. By these measures, which are indispensable for fully satisfactory regulation, the production cost of the device undergoes another substantial increase.

SUMMARY OF THE INVENTION

These disadvantages are overcome by the present invention. The invention creates a device for regulating the traveling speed of a motor vehicle with a structure which is simple, requires few structural parts, and is inexpensive. Moreover, it is suitable for simple and quick installation in the motor vehicle.

This problem is solved according to the invention, on the basis of the device initially described, by providing as a control stage a pneumatic pressure regulator similar to a manual control device, whose adjusting element can be actuated electromagnetically.

By this device of the invention, by the provision in the control stage of only a single element, controllable by the electric regulator, an electric regulator with a single signal output can be employed. Furthermore, in such a control stage, the adjusting drive lift is not dependent on the vacuum, because an equilibrium of forces occurs in the pneumatic pressure regulator which is provided as the control stage for any value of the regulating deviation. When this state of equilibrium is reached, the pressure regulator can be considered separately from the vacuum, the excess pressure, or the normal line. That is to say, in contrast to the known device, air consumption does not occur in the regulated state. This makes it possible to connect the parts of the device that are operated by a vacuum with a vacuum container already present in the motor vehicle and used, for example, for a vacuum door locking system. Thus the device can be operated independently of the vacuum in the suction pipe, whereby the regulation range can be extended to nearly 100 percent of the maximum traveling speed of the motor vehicle. Another advantage of the device according to the invention is that only a single element controllable by the electric regulator, namely, the electromagnetically regulable adjusting element, is provided and no measuring device for determining the lift variation of the adjusting drive is needed. Furthermore, only a single wire line is required between the output of the electric regulator and the electromagnetic system which actuates the adjusting element and is located at a distance from the regulator. In the known device, on the other hand, a six-wire must be used. The device according to the invention is therefore substantially easier to install.

A further improvement of the device with respect to the facility of its installation in the vehicle can be achieved by combining the adjusting drive and the pressure regulator, as well as the electromagnetic system actuating the adjusting element of the pressure regulator, into a single structural unit.

In a preferred embodiment, rubber bellows are provided as the adjusting drive. One front wall of these bellows is provided with means for fixing the device to the motor vehicle, and on the movable other front wall the pressure regulator and the electromagnetic system are mounted. Such a structure has the advantage that the pressure regulator and the electromagnetic system are protected against vibrations and shocks. A structure wherein parts of the pressure regulator and/or of the electromagnetic system form one unit with the front wall has proved particularly suitable for manufacture. Both front walls may consist of a material that can be injection-molded or pressed, such as aluminum or plastic material, and the fastening of the front walls to the rubber bellows may be carried out by buttoning into the correspondingly shaped rubber bellows.

The pressure regulator, according to a further embodiment of the invention, comprises a first chamber connected with the pressure chamber of the adjusting drive, and a second chamber connected with the vacuum source. The second chamber forms a wall of the first chamber, movable by means of the adjusting element. Furthermore, a two-way valve is provided which can be actuated by the movement of the second chamber and by way of which, on the one hand, the first chamber can be acted upon by vacuum or normal pressure, and, on the other hand, the second chamber can be connected with the first. Such a structure presents, in comparison with other possible embodiments, the advantage that it is particularly compact and space-saving.

In one embodiment, the second chamber consists of two diaphragms, clamped in at a distance from each other and rigidly connected with each other. One diaphragm forms the movable wall of the first chamber and is provided with a valve seat, and the other is connected with the adjusting element. Such an embodiment, in comparison with a chamber formed by bellows, has the advantage that the pressure regulator is of a smaller structural volume. An even more compact structure can be achieved in a device in which the second chamber consists of an element provided with a recess and fastened to a diaphragm that seals the first chamber, and furthermore provided with a valve seat. Such an embodiment, moreover, is much easier to manufacture and requires fewer structural parts than the one initially described. In the case of the embodiment last described, a particularly favorable result with respect to the structural volume and the assembly of the pressure regulator is achieved by providing the diaphragm with a central bore and arranging the diaphragm on one side of the valve seat, and the part provided with the recess on the other side, both concentric with the bore, and by connecting the two parts by means of screws, and finally by fastening the adjusting element at the part provided with the recess.

BRIEF DESCRIPTION OF THE DRAWINGS

The invention will be explained in greater detail with the aid of the drawing which contains in a partially diagrammatical representation two embodiments.

FIG. 3 illustrates another embodiment of a control stage in longitudinal section, which forms a structural unit with the adjusting drive.

DESCRIPTION OF THE PREFERRED EMBODIMENT

Figure 1:
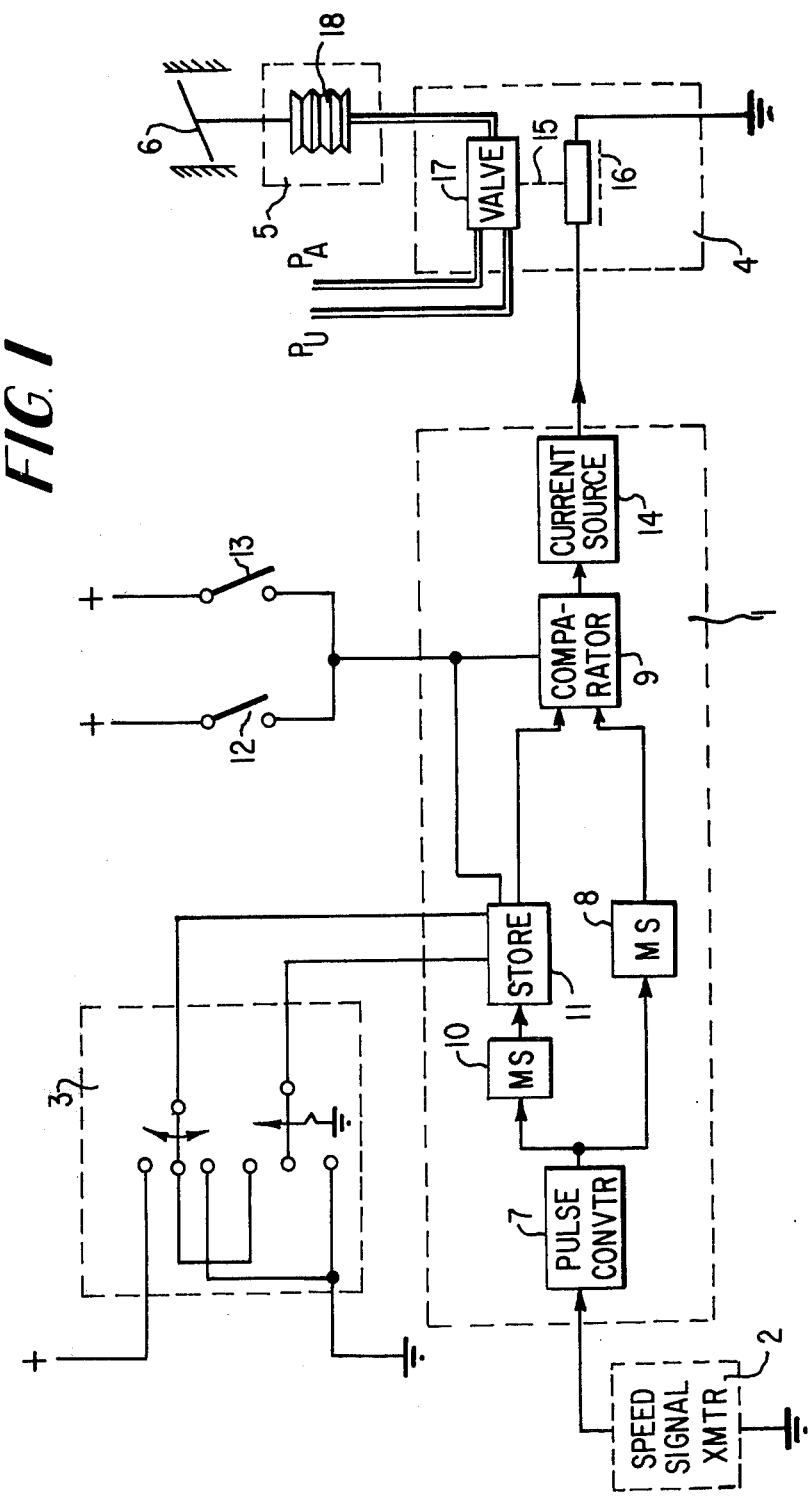
FIG. 1 is a block diagram of the device with control stage and adjusting drive.

As shown in FIG. 1, the traveling speed regulating device consists of an electric regulator 1, which is controlled by a speed signal transmitter 2 driven to respond to traveling speed, an operating unit 3, a control device 4 connected to the regulator output and an adjusting drive 5, controlled by the control stage 4 and coupled to an accelerator 6 on a vehicle engine.

The signal arriving from transmitter 2 and having a frequency proportional to the traveling speed of the motor vehicle is transformed, in a pulse converter 7 in regulator 1, into a sequence of well-formed pulses. The output of converter 7 is connected, on the one hand, by way of a monostable multivibrator (MSMV) 8 to one input of a comparator 9, and on the other hand, by way of a second MSMV 10 and a storage unit 11, to the other input of comparator 9. MSMV's 8 and 10 serve to transform the pulses transmitted by converter 7 into pulses of constant amplitude and width. Storage unit 11 is furthermore connected to operating unit 3 and, together with comparator 9, is also connected to a brake switch 12, and to an optional clutch switch 13. A controllable constant current source 14 is connected to the output of comparator 9. An electromagnetic system 16, which actuates the adjusting element, is connected to the output of the constant current source 14. The electromagnetic system can be constructed as a plunger with the adjusting element plunging therein, or as a coil with a ferromagnetic circuit and a folding armature as an adjusting element, or in any other known manner. The adjusting element 15 acts upon a valve 17 by way of which the adjusting drive 5 containing rubber bellows 18 can be acted upon by vacuum $P_U$ or ambient air $P_A$.

The mode of operation of the regulating deivce corresponds essentially to that of the known device. When the driver desires automatic regulation of the traveling speed at a specific value, upon reaching the traveling speed value, he actuates briefly a switch in the operating unit 3, whereby the speed prevailing at that instance is stored in storage unit 11. The storage unit consequently transmits a specific voltage signal, corresponding to the stored speed, to one of the inputs of comparator 9, which then compares this signal with its other input signal which corresponds to the actual traveling speed. When a difference between the two speed values occurs, e.g., due to the fact that the vehicle reaches a slope and its speed decreases, the output signal of comparator 9 changes, and consequently the signal from the controllable constant current source 14 also changes, whereby the adjusting element 15 is actuated by way of electromagnetic system 16. The result is that rubber bellows 18 are acted upon by a vacuum, and accelerator 6 is pivoted in the direction of an acceleration of the motor vehicle. A similar process occurs when a difference occurs between the stored speed value and the actual speed at an acceleration of the vehicle, e.g., at a downward incline. When the brake or clutch is touched, the regulating device is switched to an inoperative position. By actuation of the proper switch in the operating unit 3, the vehicle can, without touching the gas pedal or the brake, be accelerated or slowed down, and the resulting speed is then again automatically maintained. The operation therefore corresponds esentially to that of the known device.

Figure 2:
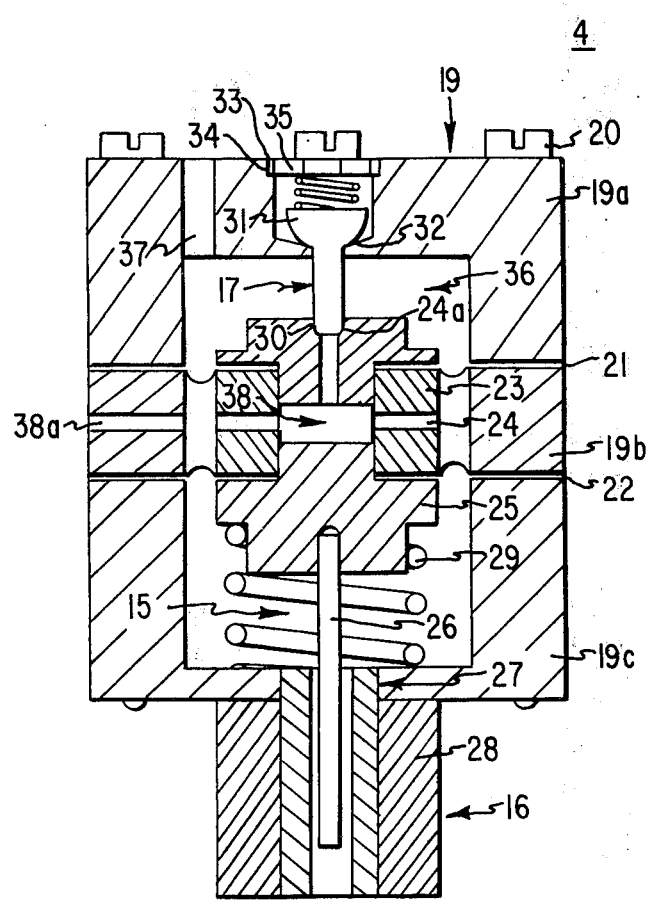
FIG. 2 illustrates an embodiment of a control stage in longitudinal section.

The embodiment of control stage 4 shown in FIG. 2 consists of a cylindrical casing 19 which is composed of the three parts 19a, 19b, and 19c. The three parts are held together by means of screws 20. Ring-shaped diaphragms 21 and 22 are clamped in respectively between parts 19a and 19b and between parts 19b and 19c. The two diaphragms 21 and 22 are rigidly connected by way of a centrally arranged ring 23 with at least two transverse bores 24. Ring 23 also serves as support for a valve seat 24a and for a locking element 25 into which is screwed the adjusting element 15, constructed as a ferromagnetic rod 26. Rod 26 projects through an opening 27 in the front of casing element 19c into a plunger 28 which is pressed into an opening 27. A pressure spring 29 is mounted between locking element 25 and the inside of the front wall of casing element 19c, which supports plunger 28.

Valve seat 24a cooperates with a valve cone 30, which is part of an element whose other end is provided with another valve cone 31. A valve seat 32, positioned in the front wall of casing part 19a, is associated with valve cone 31. Both valve cones or plugs 30 and 31 are subjected to the force of a pressure spring 33 which is supported by a ring 35 which is screwed into a taphole 34.

A chamber 36, which is limited by casing portion 19a valve seat 24a and diaphragm 21, is connected with the rubber bellows 18 of adjusting drive 5 by way of a bore 37. A chamber 38, which is formed by casing part 19b, diaphragms 21 and 22, valve seat 24 and locking element 25, is connected with the suction pipe by way of a bore 38a in casing part 19b.

Control stage 4 is shown in the state of equilibrium, that is, in the state in which the pull exerted by plunger 28 upon rod 26 is in equilibrium with the force exerted by spring 29 upon locking element 25, and with the force exerted by the vacuum in rubber bellows 18 and, in chamber 36, upon diaphragm 21 and valve seat 24a. In this state of control stage 4, the motor vehicle travels at the preset desired speed. No air is consumed.

If the actual speed of the motor vehicle now decreases, the output current of controllable constant current source 14 of electric regulator 1 increases, and the rod 26 is therefore pulled more deeply into the plunger 28. As a result thereof, the valve seat 24a is lifted off valve cone 30, and chamber 38, actuated by the vacuum, is connected with chamber 36 and, by way of rubber bellows 18, the accelerator is pivoted toward a speed increase. If, on the other hand, the actual speed of the motor vehicle now increases, the output current of controllable constant current source 14 decreases, and rod 26 is pulled out by pressure spring 29 from plunger 28 to a corresponding extent. As a result, valve cone 31 is lifted off, against the force of spring 33, from valve seat 32, and ambient air flows into chamber 36 and bellows 18, which consequently pivots accelerator 6 toward a speed decrease. The same applies when, by actuation of the proper switch in the operation unit 3, the vehicle is to be given a higher or lower speed without touching the gas pedal or the brake.

FIG. 3 shows an embodiment of control stage 4, wherein the latter is arranged on the movable front wall 39 of rubber bellows 18 and parts of the control stage form a single-piece unit with front wall 39 which is buttoned into the bellows.

The pressure regulator again comprises a first cylindrical chamber 36' which is connected, by way of a bore 40, with rubber bellows 18, and also comprises a second chamber 38' consisting of a part 42 which is provided with a bore 41 and is positioned at one side of a diaphragm 43 which is provided with a central bore. The diaphragm 43 locks a chamber 36' and is furthermore provided with a valve seat 24' which is arranged at the other side of diaphragm 43. Part 42 and valve seat 24 are fastened, by means of two screws 44, to diaphragm 43 and to each other. Chamber 38' is connected, by way of a pipe connection 45 inserted in part 42, of a hose 46, and of a further pipe connection 47, with a connecting pipe 49 molded to a diaphragm support 48. The vacuum feeding line, extending from the suction pipe, is connected with the last-mentioned pipe connection 49.

Valve seat 24' cooperates with a valve cone 30' which supports at its other end a further cone 31' associated with a valve seat 32' which is located in front wall 39. Both valve cones 30' and 31' are acted upon by the force of a pressure spring 33' supported by a disc 50 which separates chamber 36' from the interior of the bellows and is pressed into a corresponding bore. Chamber 36' can be acted upon the ambient air by way of the valve with the movable parts 31' and 32', and by way of a bore 51 which ends in the space that holds pressure spring 33'.

The two-way valve is actuated by an adjusting element 15' which is fastened, by way of a resilient joint 52, to the front wall 39 of rubber bellows 18, and by means of a tab 53 to part 42. An anchor plate 54, which cooperates with a coil 55 provided with a ferromagnetic core, is fixed on the free arm of adjusting element 15'.

Control stage 4 is arranged on front wall 39 and is protected against mechanical damage by a cover 56.

We claim:

1. In a device for regulating the traveling speed of a motor vehicle, comprising:
   A. an electric regulator means acted upon by a speed-responsive signal for comparing the prevailing traveling speed with a prespecified desired traveling speed and, in the case of a deviation of the actual traveling speed from the prespecified one, for emitting an error signal proportional to the deviation variable,
   B. a pneumatic adjusting drive means for acting upon an element affecting the ratio between fuel and air in the fuel-air mixture fed to the motor vehicle engine, and
   C. a control stage means controlled by a signal emitted by the regulator means for controlling the drive means by means of air pressure,
   the improvement wherein the control stage means comprises:
   D. a first source of air at a first pressure,
   E. a second source of air at a second pressure,
   F. a chamber of selectively variable air pressure pneumatically connected to operate the adjusting drive,
   G. a first valve seat in fixed interposition between the first source of air and the chamber,
   H. a second valve seat situated between the second source of air and the chamber and arranged to be displacable from or toward the first valve seat,
   I. first and second valve plug means for respectively checking air flow past the first and second valve seats, said valve plug means being rigidly connected to one another, and
   J. electromagnetic means responsive to the error signal for moving the second valve seat in either of two directions from an equilibrium position for unseating only the first valve plug when moving in one direction, for unseating only the second valve plug when moving in the other direction, and for unseating neither valve plug when in the equilibrium position,
   whereby air flow past the valve seats when needed to change the pressure of the chamber, but substantially no air flows past the valve seats when the pressure of the chamber is correct.

2. A device according to claim 1 wherein the pneumatic adjusting means comprises the accelerator.

3. A device according to claim 1, wherein the adjusting drive means, the pressure regulator and the electromagnetic system actuating the adjusting element of the pressure regulator are combined to a single structural unit.

4. In a device for regulating the traveling speed of a motor vehicle, comprising:
   A. an electric regulator means acted upon by a speed-responsive signal for comparing the prevailing traveling speed with a prespecified desired traveling speed and, in the case of a deviation of the actual traveling speed from the prespecified one, for emitting a signal proportional to the deviation variable, B. a pneumatic adjusting drive means for acting upon an element affecting the ratio between fuel and air in the fuel-air mixture fed to the motor vehicle engine, and C. a control stage means controlled by a signal emitted by the regulator means for controlling the drive means by means of air pressure, the improvement wherein the control stage means comprises a pneumatic pressure regulator including an adjusting element which is actuated by an electromagnetic system, wherein the adjusting drive means, the pressure regulator and the electromagnetic system actuating the adjusting element of the pressure regulator are combined to a single structural unit, and wherein the adjusting drive means further comprises rubber bellows, one front wall of the bellows being provided with means for fastening the bellows to the motor vehicle and a movable other front wall of these bellows having the pressure regulator and the electromagnetic system are mounted thereon.

5. A device according to claim 4, wherein parts of the pressure regulator and of the electromagnetic system form a single-piece unit with the front wall.

6. In a device for regulating the traveling speed of a motor vehicle, comprising:

A. an electric regulator means acted upon by a speed-responsive signal for comparing the prevailing traveling speed with a prespecified desired traveling speed and, in the case of a deviation of the actual traveling speed from the prespecified one, for emitting a signal proportional to the deviation variable, B. a pneumatic adjusting drive means for acting upon an element affecting the ratio between fuel and air in the fuel-air mixture fed to the motor vehicle engine, and C. a control stage means controlled by a signal emitted by the regulator means for controlling the drive means by means of air pressure, the improvement wherein the control stage means comprises a pneumatic pressure regulator including an adjusting element which is actuated by an electromagnetic system, wherein the adjusting drive means, the pressure regulator and the electromagnetic system actuating the adjusting element of the pressure regulator are combined to a single structural unit, and wherein the pressure regulator is provided with a first chamber connected with the pressure chamber of the adjusting drive, and a second chamber connected with the vacuum source, the second chamber forming a wall of the first chamber, the wall being movable by means of the adjusting element, and wherein a two-way valve is provided which can be actuated by the movement of the second chamber and by way of which, on the one hand, the first chamber can be acted upon selectively by a vacuum or ambient pressure, and, on the other hand, the second chamber can be connected with the first chamber.

7. A device according to claim 6, wherein the second chamber consists of two rigidly connected diaphragms clamped in at a distance from each other, one of the diaphragms forming the movable wall of the first chamber and being provided with a valve seat, and the other diaphragm being connected with the adjusting element.

8. A device according to claim 6, wherein the second chamber consists of a part provided with a recess, the said part being fastened to a diaphragm which locks the first chamber, and being provided with a valve seat.

9. A device according to claim 8, wherein the diaphragm is provided with a central bore, and wherein the diaphragm is mounted on one side of the valve seat, and the part provided with the recess is mounted on the other side, in each case being mounted concentric with the bore, the two elements being connected by means of screws, and the adjusting element being fastened to the part provided with the recess.

* * * * *